United States Patent
Guim Bernat et al.

(10) Patent No.: US 12,244,507 B2
(45) Date of Patent: Mar. 4, 2025

(54) INTELLIGENT DATA FORWARDING IN EDGE NETWORKS

(71) Applicant: Intel Corporation, Santa Clara, CA (US)

(72) Inventors: Francesc Guim Bernat, Barcelona (ES); Ned M. Smith, Beaverton, OR (US); Kshitij Arun Doshi, Tempe, AZ (US); Suraj Prabhakaran, Aachen (DE); Timothy Verrall, Pleasant Hill, CA (US); Kapil Sood, Portland, OR (US); Tarun Viswanathan, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 953 days.

(21) Appl. No.: 17/033,140

(22) Filed: Sep. 25, 2020

(65) Prior Publication Data
US 2021/0021533 A1 Jan. 21, 2021

(51) Int. Cl.
*H04L 47/28* (2022.01)
*H04L 47/74* (2022.01)
*H04L 47/78* (2022.01)
*H04L 49/15* (2022.01)

(52) U.S. Cl.
CPC ............ *H04L 47/28* (2013.01); *H04L 47/746* (2013.01); *H04L 47/788* (2013.01); *H04L 49/15* (2013.01)

(58) Field of Classification Search
CPC ...... H04W 4/029; H04W 40/18; H04L 47/83; H04L 47/28; H04L 47/746; H04L 47/788; H04L 49/15; H04L 67/10
See application file for complete search history.

(56) References Cited

U.S. PATENT DOCUMENTS

| | | | |
|---|---|---|---|
| 10,452,824 B2 | 10/2019 | Egner et al. | |
| 11,323,509 B2* | 5/2022 | Lincourt | H04L 67/1012 |
| 2013/0116965 A1* | 5/2013 | Lin | G06F 15/00 702/150 |
| 2016/0020985 A1 | 1/2016 | Swartzentruber et al. | |
| 2017/0303169 A1* | 10/2017 | Hampel | H04W 36/0016 |
| 2019/0042319 A1* | 2/2019 | Sood | G06F 21/74 |
| 2019/0149992 A1* | 5/2019 | Cha | H04W 12/08 709/223 |

(Continued)

FOREIGN PATENT DOCUMENTS

| | | |
|---|---|---|
| CN | 114338659 | 4/2022 |
| DE | 102021210705 | 3/2022 |

OTHER PUBLICATIONS

"Netherlands Application Serial No. 2029044, Search Report mailed May 25, 2022", W English Translation, 10 pgs.

(Continued)

*Primary Examiner* — Oussama Roudani
(74) *Attorney, Agent, or Firm* — Schwegman Lundberg & Woessner, P.A.

(57) ABSTRACT

Systems and techniques for intelligent data forwarding in edge networks are described herein. A request may be received from an edge user device for a service via a first endpoint. A time value may be calculated using a timestamp of the request. Motion characteristics may be determined for the edge user device using the time value. A response to the request may be transmitted to a second endpoint based on the motion characteristics.

18 Claims, 13 Drawing Sheets

(56) References Cited

U.S. PATENT DOCUMENTS

2019/0190802 A1\* 6/2019 Jalali .................. H04L 67/1078
2020/0008054 A1\* 1/2020 Wifvesson ............ H04W 36/14
2020/0145337 A1\* 5/2020 Keating ............. H04L 47/2425
2021/0270930 A1   9/2021 Mohammadi et al.
2022/0078684 A1\* 3/2022 Fehrenbach ...... H04W 36/0083

OTHER PUBLICATIONS

"Netherlands Application Serial No. 2029044, Office Action mailed Sep. 7, 2021", w English translation, 9 pgs.
Koita, Abdourahmane, "New probabilistic approach to estimate vehicle failure trajectories in curve driving", Probabilistic Engg Mechanics (Elsevier), (Oct. 2013), 10 pgs.

\* cited by examiner

INTELLIGENT DATA FORWARDING IN EDGE NETWORKS

TECHNICAL FIELD

Embodiments described herein generally relate to data forwarding and, in some embodiments, more specifically to intelligent data forwarding in edge networks.

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office, a vehicle such as a car/bus/train/etc., a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, machine learning/artificial intelligence services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and network function services for example security services, and applications at locations closer to the edge of the network.

Data forwarding in multi-tenant edge networks allows resources to follow an end user device a desired quality of experience (e.g., quality of service) as the device moves through the network. If a workload or a portion of the workload that is scheduled at a node in an edge network receives insufficient resources at that node, the workload may be unable to complete requests for service in a timely manner. For example, it may appear to a client which submits requests that the service delivered to the client by the edge network is slower, unavailable, or unreliable. Further as an example, the edge network may appear to the client as being unpredictable whereby at different times the client may find that some requests fail to generate a response without any apparent reason. Thus, resources are provided to workloads as they move to improve the desired qualities of experience.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 8:
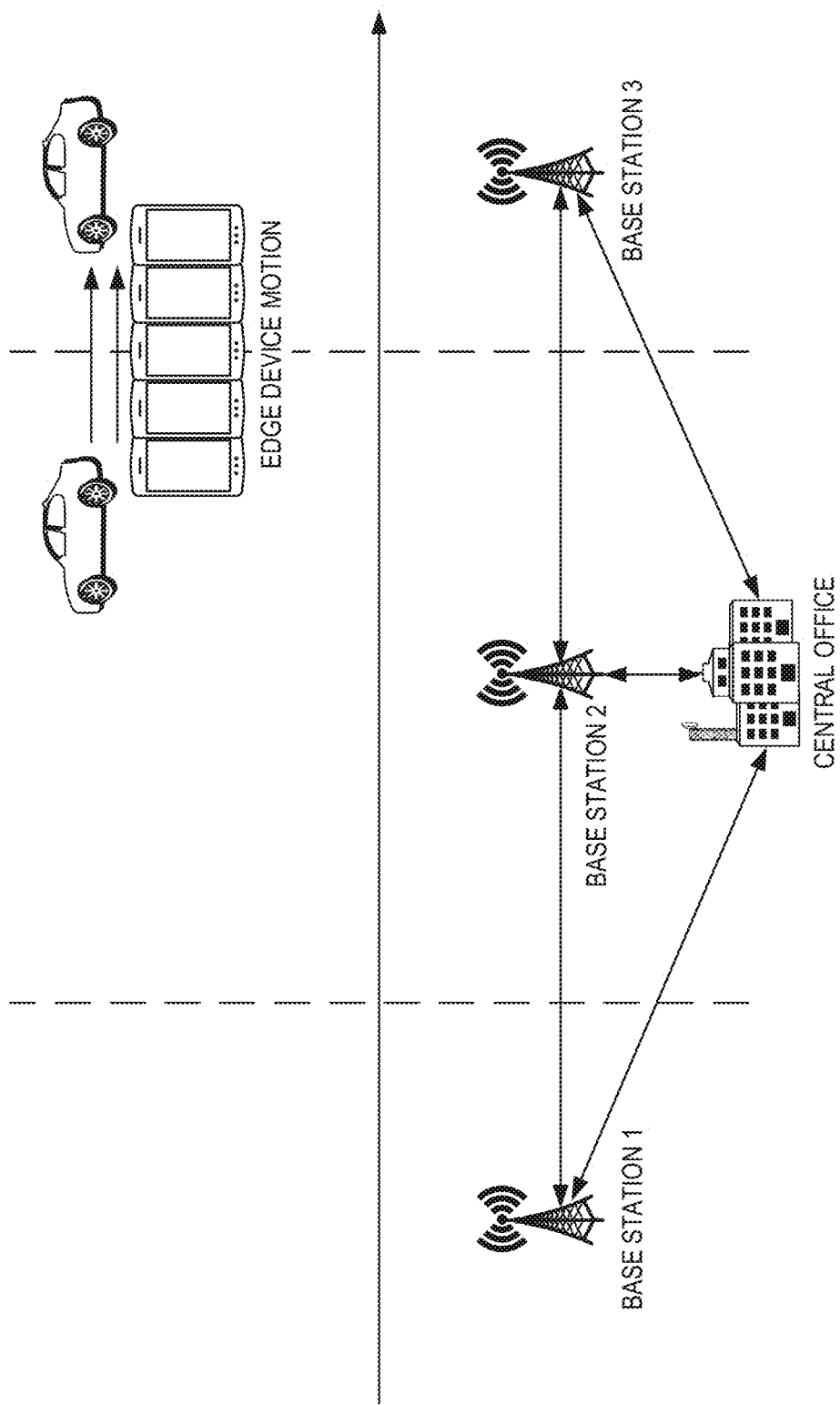
FIG. 8 illustrates an example of movement of an edge device, according to an embodiment.

In emerging distributed workloads and technologies (e.g., Fog, 4G, 5G, etc.), interactions between moving devices and cloud services may demand low latency and high throughput communications. The services may reside on an operator's network (e.g., such as in a base station, central office, a data center, etc.), in a private enterprise infrastructure (e.g., CDNs delivering content, etc.), in hybrid or virtual private infrastructures. The systems and techniques discussed herein provide real-time and bounded latency processing and transporting as the end device is not stationary. Not only is the end device in motion, but as shown in FIG. 8, neither, in most cases, are the peer services with which it interacts. This is as the movement of the end device may, in general, transfer responsibility for serving it from one endpoint in the infrastructure to another. In the process: (a) the base station with which the end device communicates may change, (b) some of the services that handle its work may change, (c) the credentials that are needed for continuing to request and receive services may change. (d) the configuration of resources it needs for the service may change, and so on.

At the same time, other backend services (such as the one shown running in a central office in FIG. 8) may not move but may change its conversation peers. Many of these changes are to be handled without incurring perceptible delays or data losses because, in general, different services or different usages are tolerant to such variations to different degrees. The challenge of maintaining low latency is further amplified by the increase in packet processing that is associated with the movement-service providers have shown that packet forwarding traffic (e.g., to handle UE movement across base stations) may represent about 50% of the total traffic. This problem will become more critical as more services and more devices are connected to the infrastructure and ultra-low latency protocols appear in the network. The systems and techniques discussed herein use historical device movement information (provided by the device and/ or by the central office) to predict and perform adjustments and credentialing several units of time ahead of the actual movement of a device.

The historical device movement information is used to predict when packets should be sent to the current end point (EP), and when they should be speculatively forwarded to another EP where a user equipment (UE) device may be serviced several time steps later, once the requested data arrives (thus masking the traffic and compute latencies proactively). The same prediction methods may be used to pre-compute and share various credentials and configuration needs for the services that move either from one EP to another, or the credentials and configuration that are used by backend services that perform other downstream computations for the EPs to which the UE device is predicted to move.

The field is emerging, and thus salient approaches are yet to emerge. Current schemes for delivering traffic and performing such operations are based on reinitiating connection setups (e.g., session handoffs), transferring state as needed, and resubmitting operations as needed. This is one of the reasons why forwarding of network traffic constitutes a significant portion of many mobile conversations between devices and services—and often times between services themselves. In contrast to traditional handoff techniques, the systems and techniques discussed herein introduce an enlightened mechanism to predict transitions of connection end points and on that basis proactively migrate/forward data reducing the need to do so reactively. Thus, the resource load for forwarding payloads, restarting operations, etc., are reduced which jay prevent increased latency.

Figure 1:
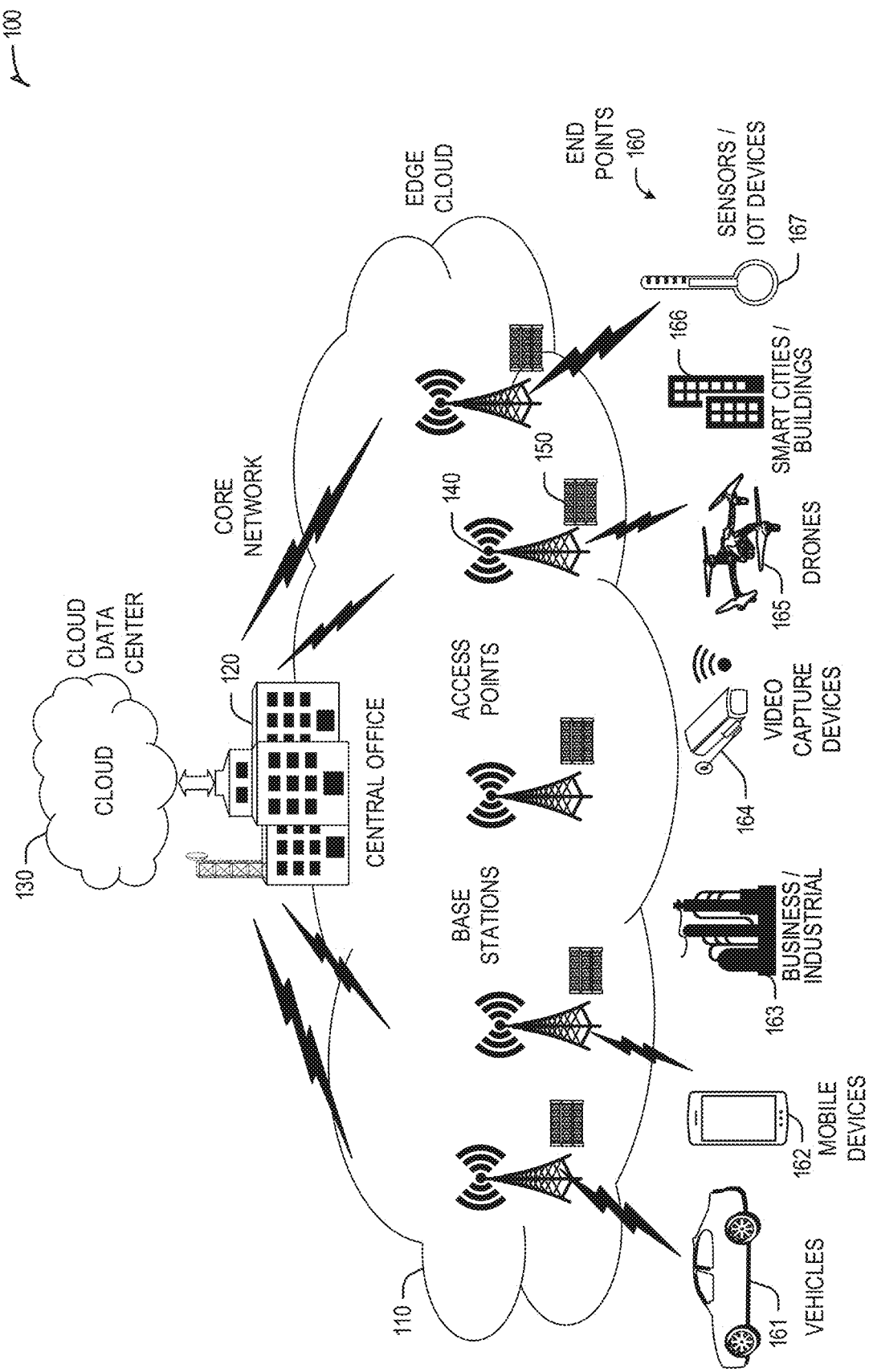
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge". "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
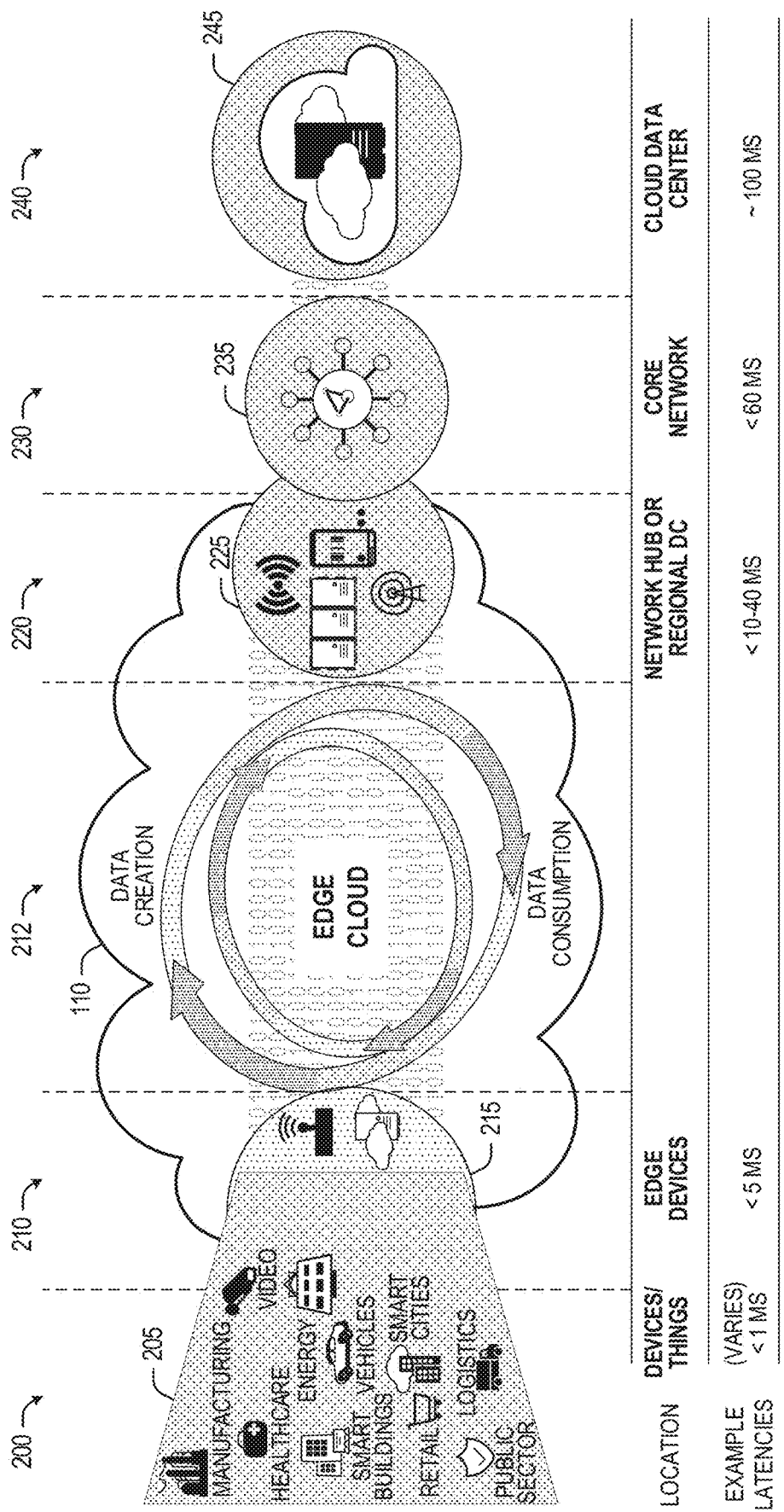
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor). Security may underlie the infrastructure within the layers of the network.

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs). Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
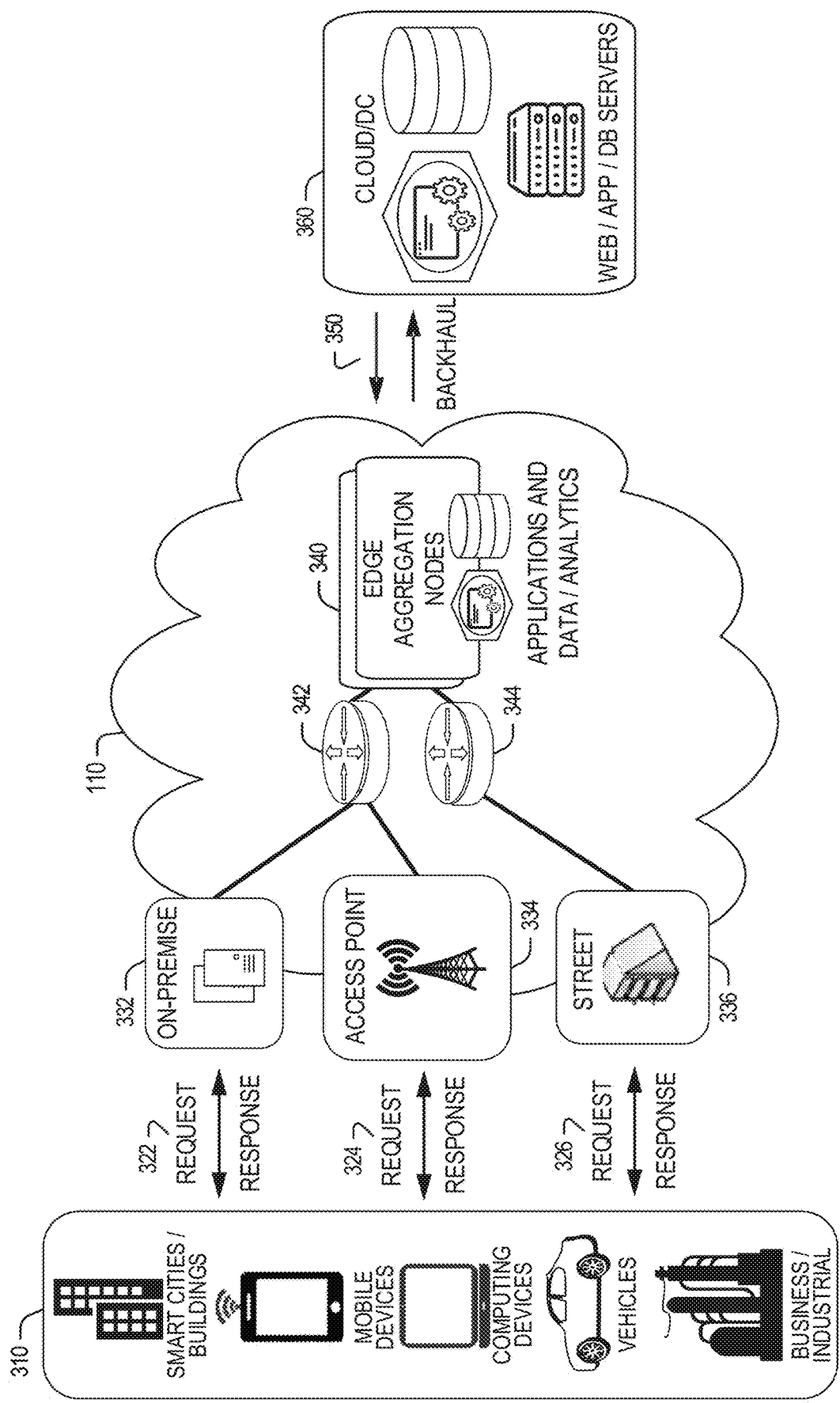
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
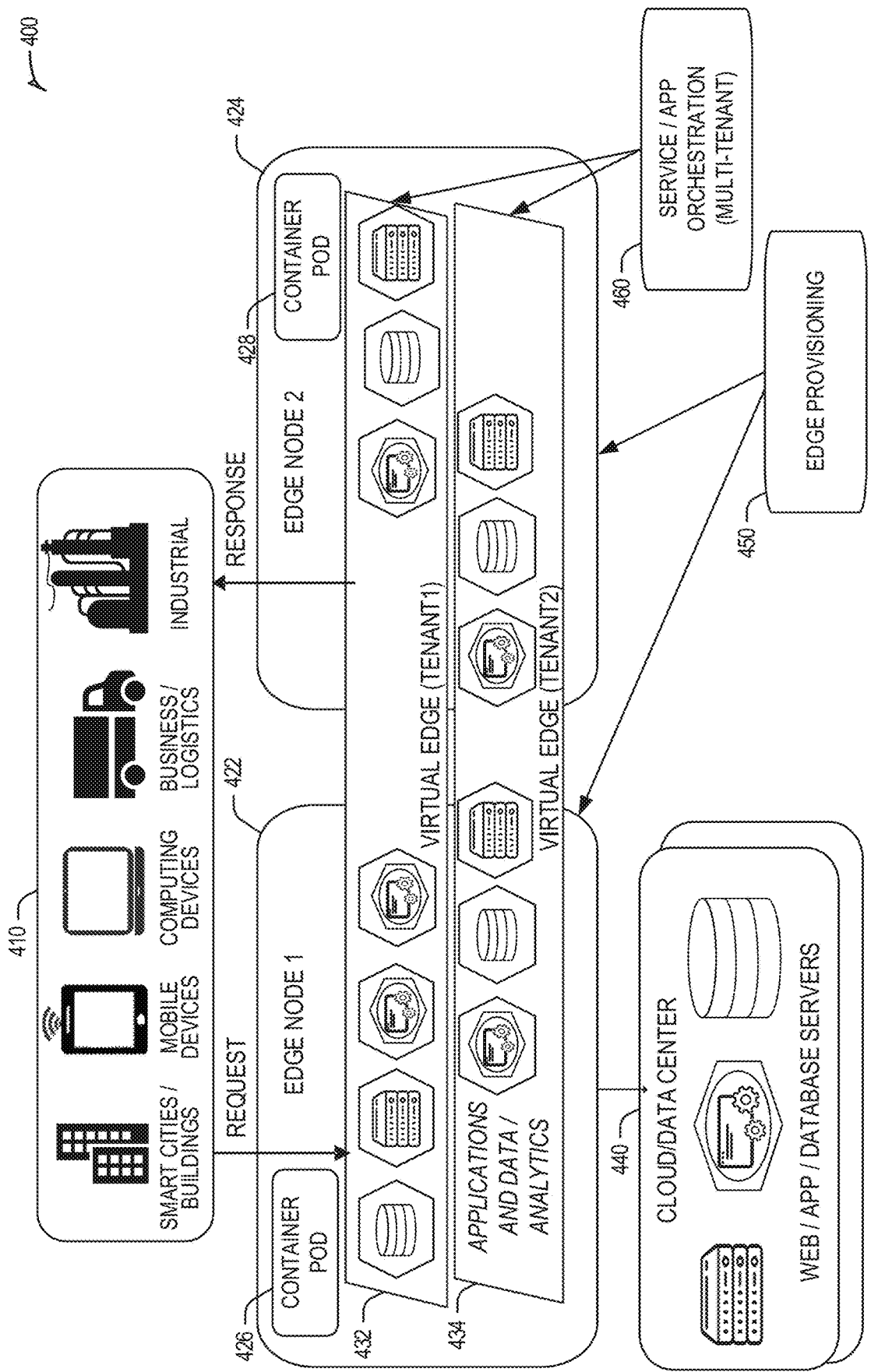
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc.

However, the edge cloud enables coordination of processing among multiple edge nodes for multiple tenants or entities.

In the example of FIG. 4, these virtual edge instances include: a first virtual edge 432, offered to a rust tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant 1 'slice' while a Tenant 2 may function within a tenant 2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines. Servlets, servers, or other computation abstraction may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
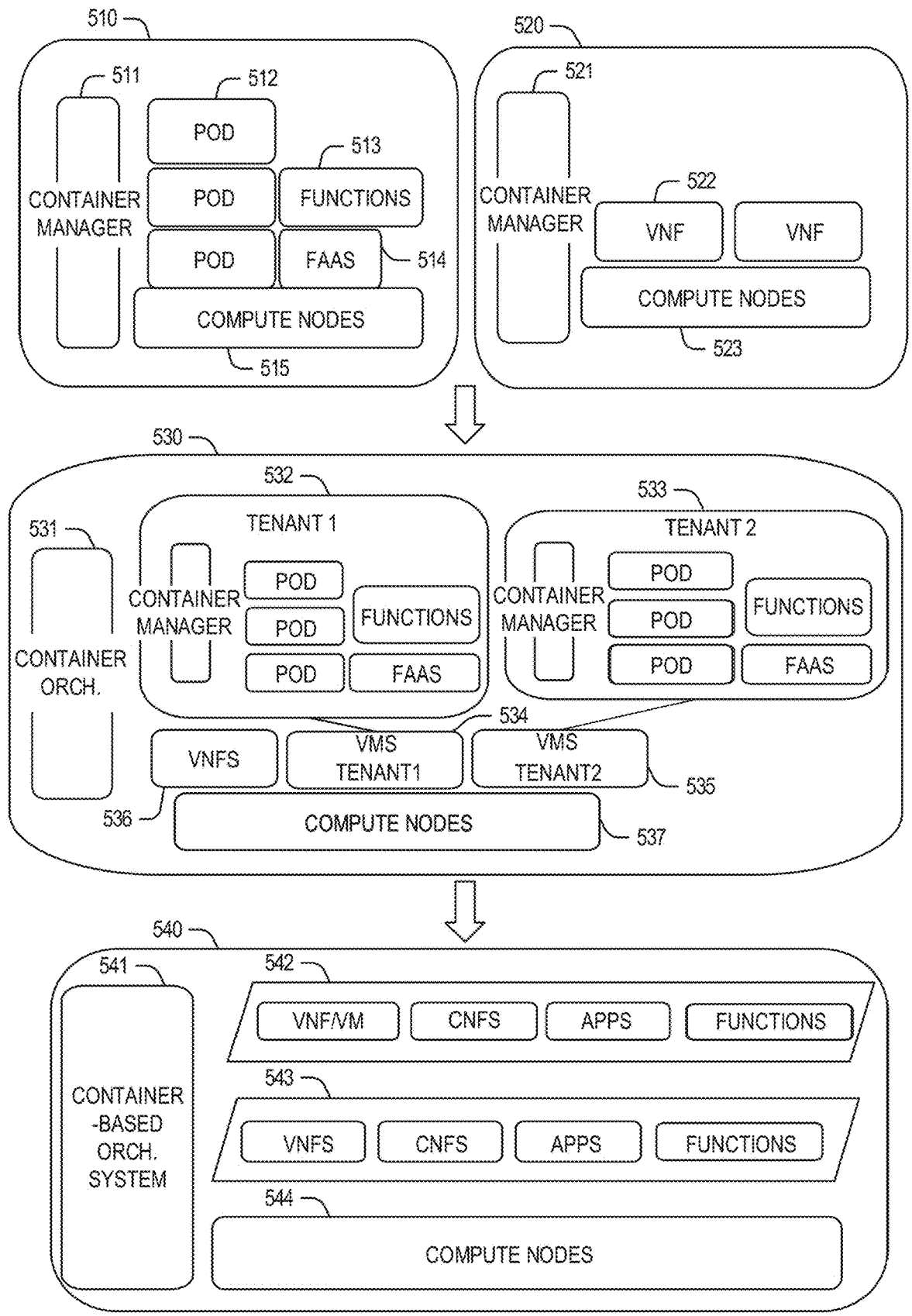
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
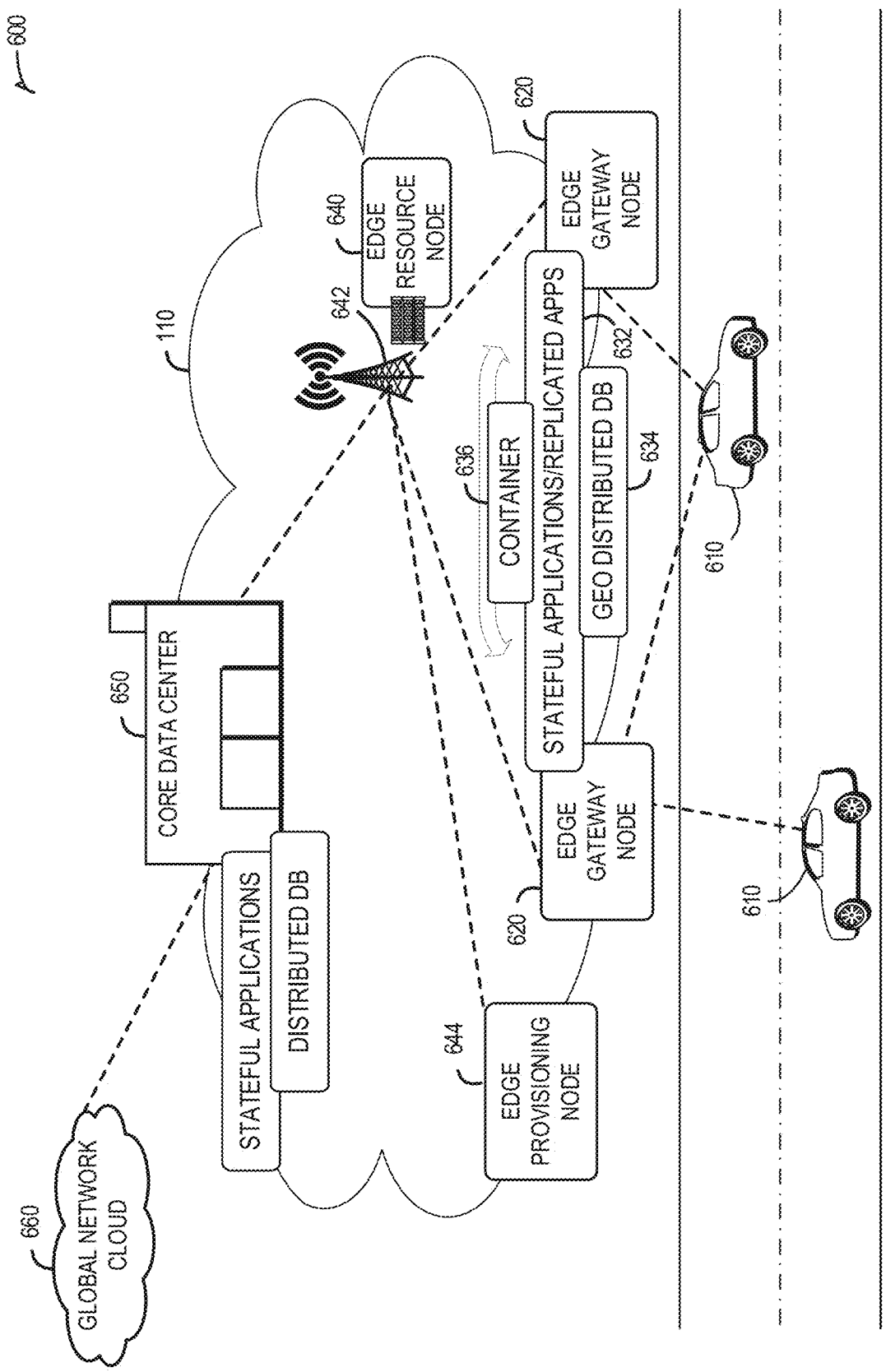
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a based station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620.640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars. (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 can be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different components of the computer readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
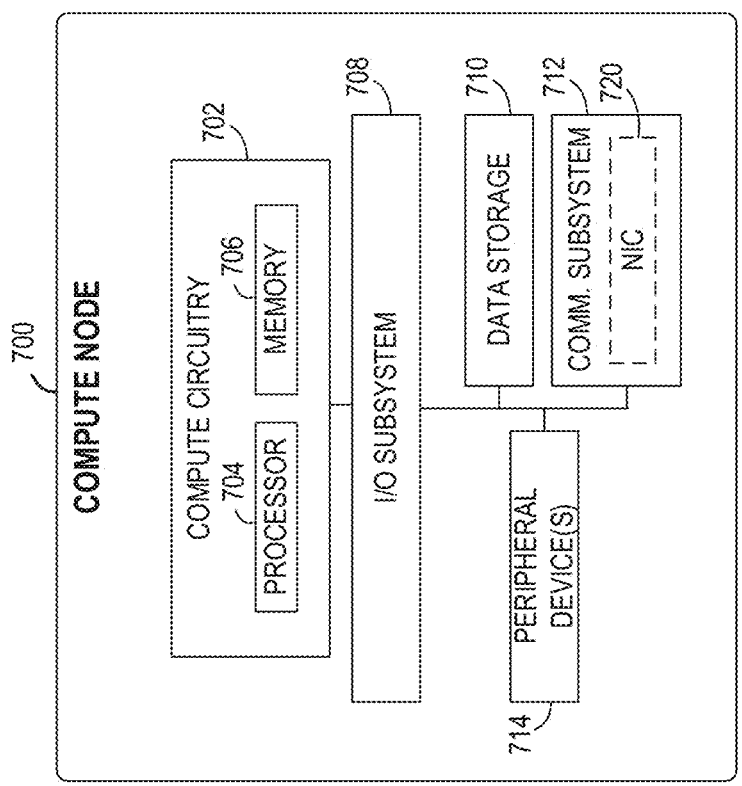
FIG. 7A provides an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein.

Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth@, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
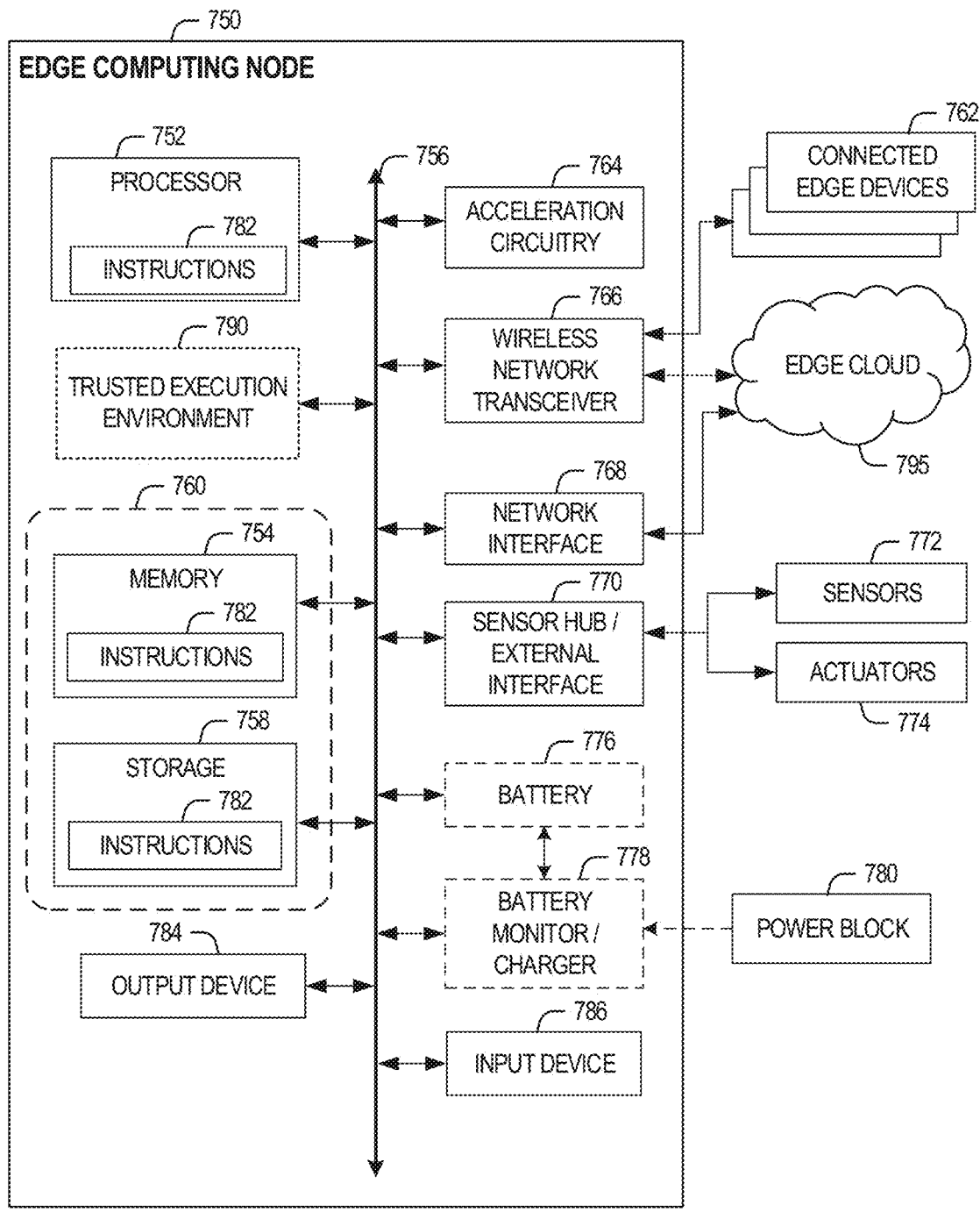
FIG. 7B provides a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing device 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, Calif. As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices. Inc. (AMD®) of Sunnyvale, Calif., a MIPS®-based design from MIPS Technologies. Inc. of Sunnyvale, Calif., an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies. Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN). DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766.768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, Calif. among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® TrustZone® hardware security extensions. Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 9:
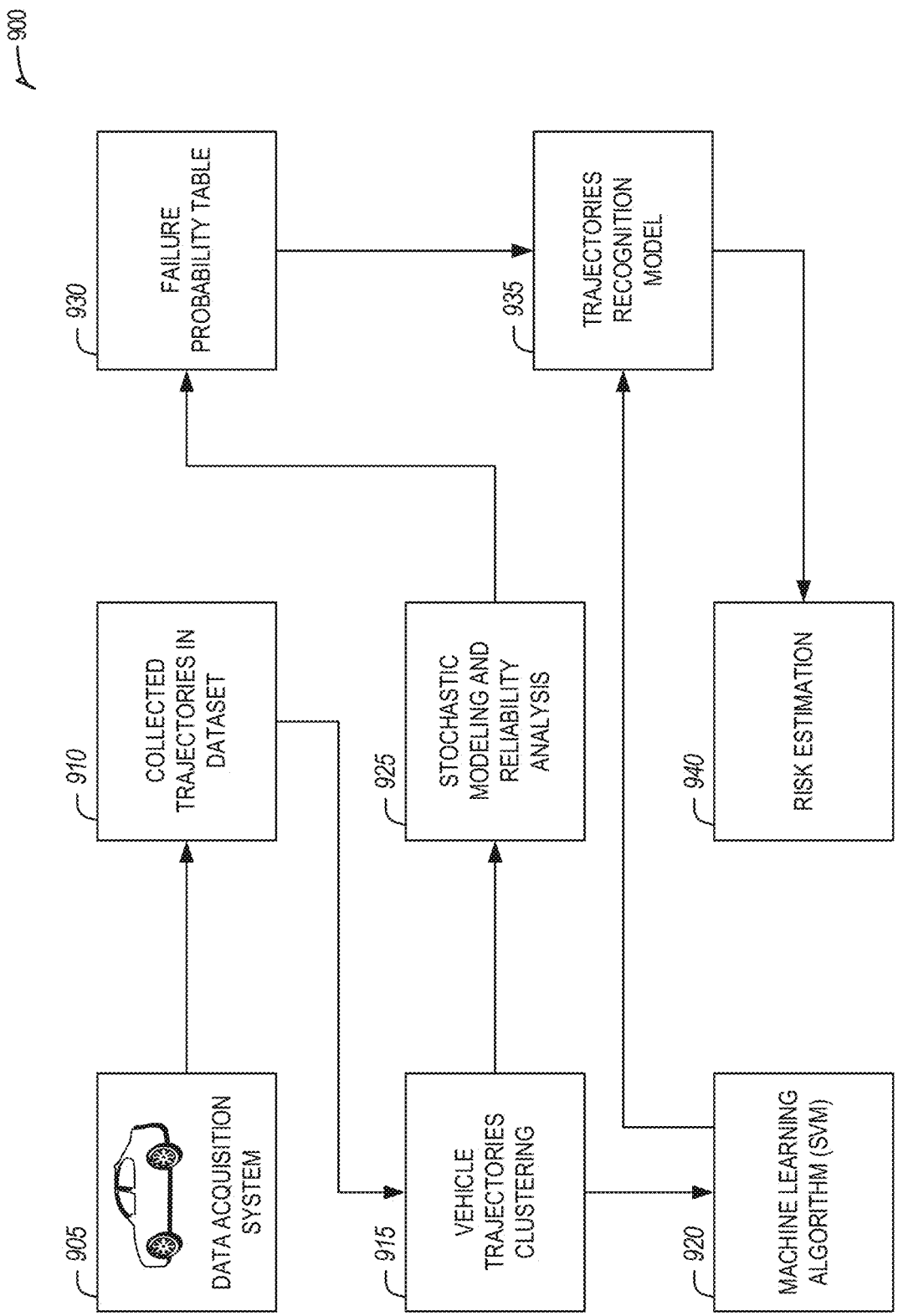
FIG. 9 is a block diagram that illustrates an example of a latency sensitive service.

FIG. 9 is a block diagram that illustrates an example of a latency sensitive service 900. FIG. 9 is an example of a latency sensitive service 900 from A. Koita et. al., "New probabilistic approach to estimate vehicle failure trajectories in curve driving", Probabilistic Engg Mechanics (Elsevier) October 2013. The latency sensitive service 900 uses a probabilistic model trained on vehicle trajectories over dangerous bends to estimate the likelihood of risky failures in curve driving. During its application, the actual trajectory of a vehicle is mapped to a trajectory recognition model 935, which gives a readout of the possible risk 940 in real time, so that a driver may be alerted and/or assistive systems engaged. Previously, the training consists of a discretized representation of acquired 905 and collected trajectories 910 that are clustered 915 based on deviation distances, and then associated 930 with probabilities of exceeding a particular risk threshold 930. The training also partitions 920 trajectories and associates the calculated risks with them to build the model 935, so that a set of observations may be mapped in one step to the risk associated with their latent trajectory.

For example, risk factors associated with navigating a turn or other road hazard by a vehicle may be tied to actual dynamics of the turn or other road hazard. Hence, the vehicle capabilities are correlated with map data that contains a detailed understanding of the turn or other road hazard. For example, the data may include turn radius, surface conditions, bank/slope, etc. This data combined with vehicle capabilities may be a more accurate indication of risk. In cases involving assistive driving, there may be advanced driver-assistance systems (ADAS) levels available but not enabled such as, by way of example and not limitation, automated parking, automatic turn navigation that is beyond the skill of the driver, etc. The risk of a curve may be evaluated and may automatically engage or enable a capability if the capability is available but disabled. The driver may not have time to mentally process warning lights and messages if the curve dynamics are beyond the capabilities of the vehicle.

In this example, to compute the risk and to make decisions in real time, the risk assessment service receives the data from the vehicle (e.g., UE), pre-processes the data, extracts and represents the data of interest (e.g., set of locations leading to identifying a trajectory cluster), applies a risk assessment algorithm, and returns a result to the vehicle-which may have moved to another base station at any point during risk computation.

Figure 10:
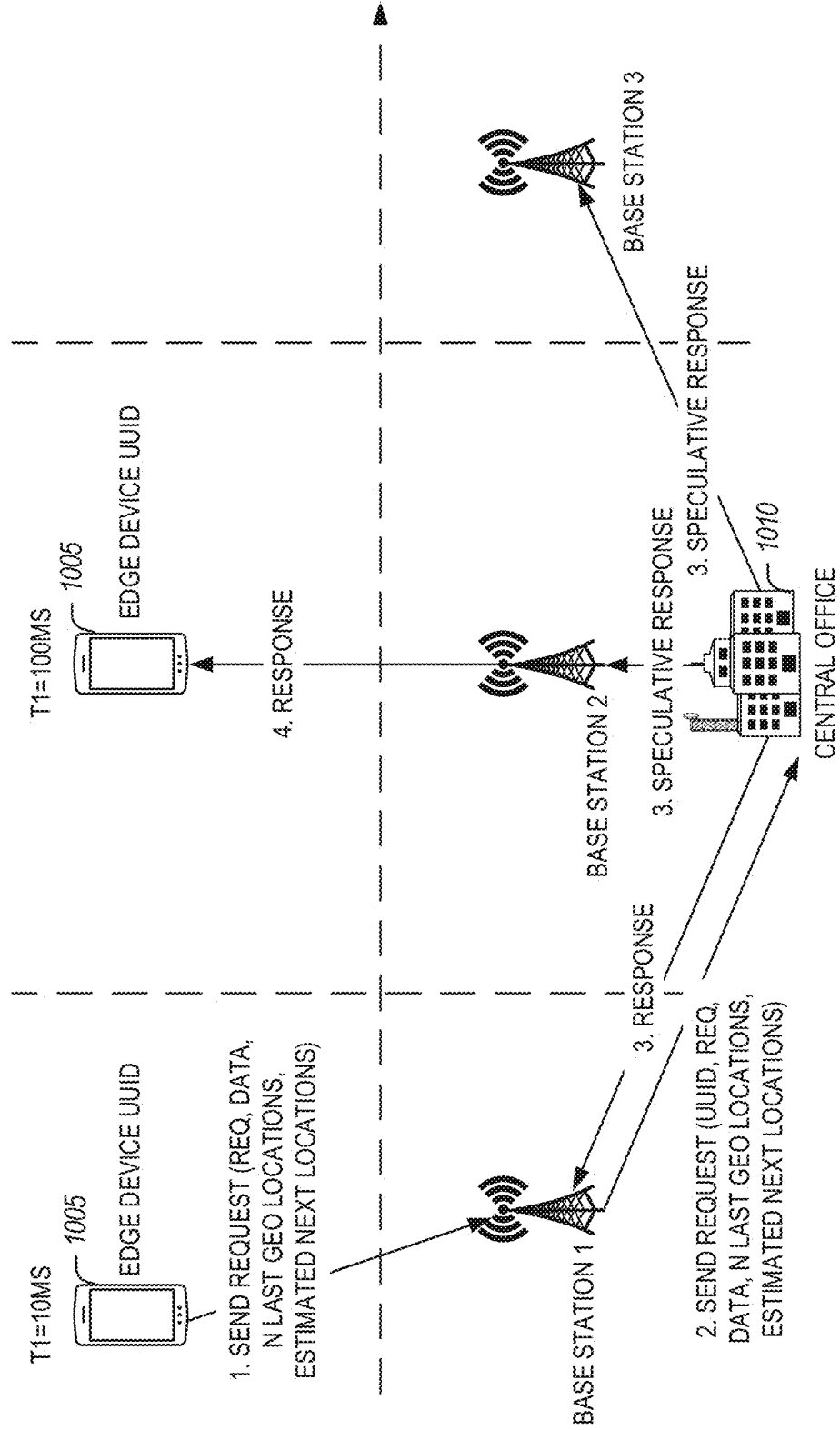
FIG. 10 illustrates an example data flow for intelligent data forwarding in edge networks, according to an embodiment.

FIG. 10 illustrates an example data flow 1000 for intelligent data forwarding in edge networks, according to an embodiment. FIG. 10 illustrates lower level decisions made to perform speculative packet forwarding. FIG. 10 shows an end device 1005 making a request (step 1) to a service that happens to be running at a central office 1010. The request transits through one end point (EP) (e.g., base station 1) which forwards it along with the universally unique identifier (UUID) of the requestor in step 2. In step 3, a response is issued back to the first EP; but in addition, it is also speculatively forwarded to one or more second EPs (e.g., base station 2, base station 3, etc.) according to a prediction for the end device 1005 having moved into, or about to move out of, the first EP's coverage and into the coverage of the one or more second of the second EPs. Various policies and heuristics govern the prediction as well as the speculative forwards.

Platforms and services implement capabilities and policies to decide whether, when, and where to perform proactive transmissions of payloads based on accumulated current and historical trajectories of devices. Such historical information may include (but is not limited to):

1) Prior information on how frequently the end device 1005 has changed from one EP to another EP to estimate the likelihood that the device is still connected or about to be disconnected from the current EP.

2) Prior information on what EP the end device 1005 has been connected to estimate the potential next EP (or EPs) where it will be connected. Based on direction of movement, and the EP mapping, motion trajectory information is derived (and the prediction model is continuously updated).

3) Additionally, the end device 1005 itself may provide hints in this respect. In FIG. 10 for example, the end device 1005 provides hints indicating its current location history and potential forward locations it is headed towards (e.g., a car route, a train schedule, etc.). This is optional given it uses some part of the payload and may consume some power of the end device 1005. However, depending on the end device 1005, it may be helpful to get the result on in a desired time span.

Security credentials and configuration information are used to reshape resource configurations, etc. 4) The prediction of the one or more next EPs (e.g., the EPs into whose coverage the end device 1005 is expected to move) is processed to identify if, or when, the EP is expected to cross from one security domain to another (e.g., from the coverage of a first edge services provider to that of a second edge services provider). In the case that there is a security domain change, a new security credential is proactively established—for example by pre-performing any necessary key computations through edge-service-provider to edge-service-provider proxy services. In an example, the edge service providers may have proxy services in their networks that act as envoys for other edge service providers to perform key precomputations in a confidential and secure manner. This new security credential (e.g., a key, etc.) is transferred ahead of time to any data forwarding services in the current EP so that the current EP can forward any data that is properly encrypted or otherwise protected against tampering by that new security credential. In addition, the new security credential is forwarded to the next predicted EP over a virtual channel that is established for the proxying services. In the case that there is not a security domain change, the original security credential (e.g., a key, etc.) is transferred from current EP to one or more next EPs.

5) As the end device 1005 moves, other associated information such as authentication or attestation codes are also sent forward. These may be needed even when the end device 1005 is moving between EPs that belong to the same edge service provider because the next EP may not always have such codes within its own secure storage (or secure cache) for timely retrieval.

6) Similarly, various billing information, credits, personalization data, etc. may also be shared proactively so that logging of chargeable events may continue, and any personalization of services may be achieved in a seamless manner. This may happen both for transfers that occur within and between edge service domains.

7) Any operator-to-operator agreements (e.g., between cellular service providers, etc.) that use mapping of service parameters from an original provider's domain (e.g., data bandwidth capped at 1.2 Gb/s in a home provider translating to a data bandwidth cap of 0.5 Gb/s in a foreign provider, etc.) are also parsed and those service parameters are automatically applied when the end device 1005 enters the foreign provider's domain. Similarly, the two operators may themselves be leasing capacity (e.g., 5G bandwidth, etc.) from some other operator, and may have one type of roaming agreement for their home subscribers and a different one for their guests (e.g., UEs homed in a foreign operator's network, etc.). Accordingly, such roaming parameters may also be automatically applied both in delivering services and for billing.

8) For data that is none-static (such as billing), after the migration is done, a continuation billing record identifier is sent from the first EP to the second EP. Accordingly, the second EP may continue to accumulate billing data against the same billing record identifier.

9) Where the next-EP prediction is not strongly centered on a single EP and more than one EP is predicted with comparable likelihoods, the forwarding of data, billing id, etc., may be sent over multicast channels (e.g., to reduce transmit overheads, reduce latency, etc.).

The systems and techniques discussed herein mitigates services disruption caused by movement. Benefits of the architecture over conventional solutions include: Latency savings to the services and reduction of likelihood that retransmits are needed between EPs; Reduced costs where the end device 1005 or the central office (CO) 1010 may predict the next estimated location with high confidence and the CO may only return the result directly to the next EP instead of the EP that was used to send the request; User experience will be improved for interactive services that demand smooth throughput. One of the things that frustrates users is waiting for data while moving. For example, this may be experienced in the high speed trains; Prediction may also be used by a service to move its EP based state from one EP to another in anticipation of the end device 1005 moving from the former EP's coverage to the latter. That is, where a service has both an EP component and a backend (customer premise equipment (CPE)/Central office) component, the EP component's state may be proactively moved or replicated from one EP to another, for even greater agility; The solution discussed herein may also be generally useful in Information Centric Networking, where it may be used to proactively predict and cache information in conjunction with the movements of requestors for that information.

Figure 11:
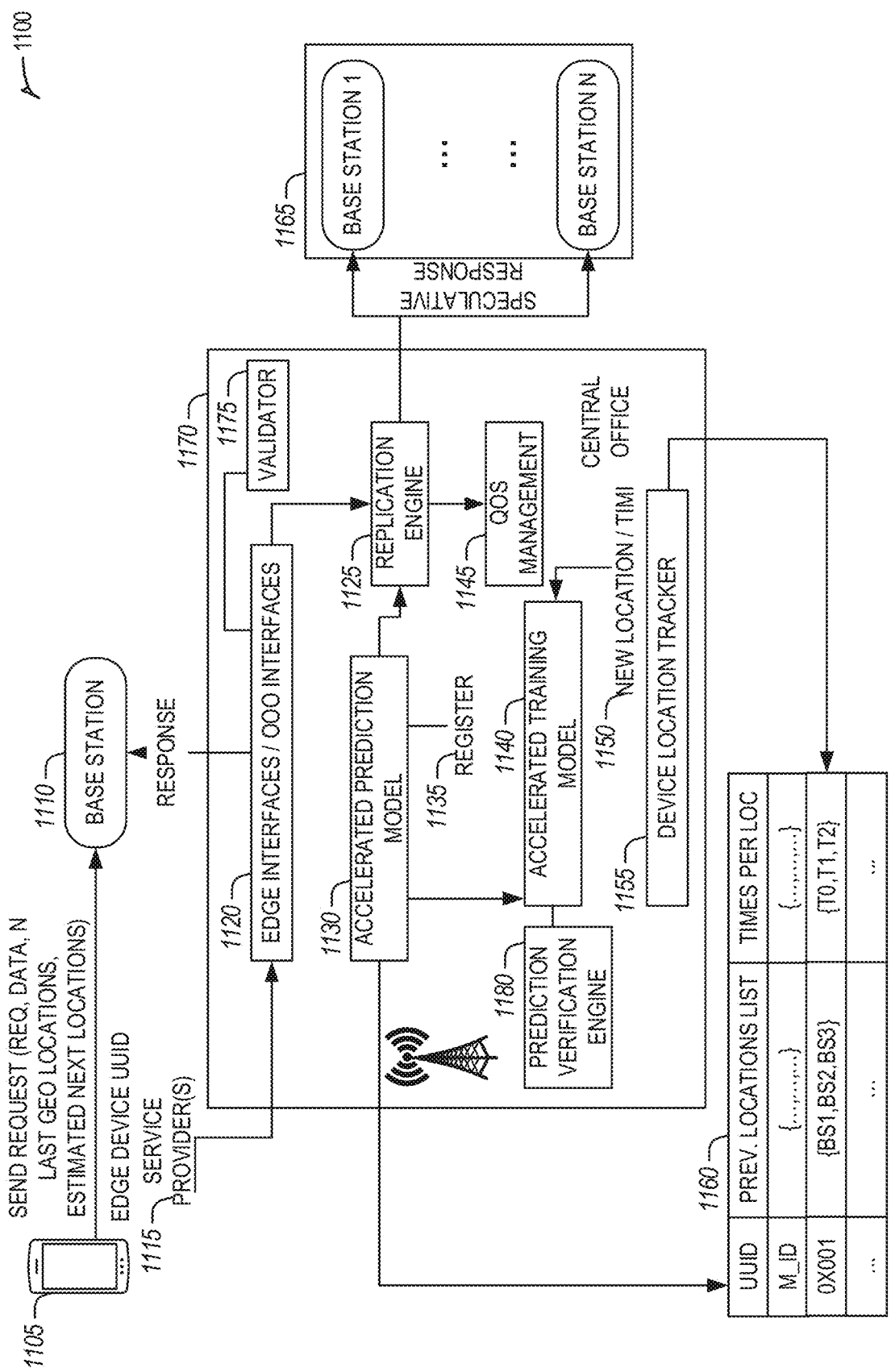
FIG. 11 is a block diagram of an example of a system for intelligent data forwarding in edge networks, according to an embodiment.

FIG. 11 is a block diagram of an example of a system 1100 for intelligent data forwarding in edge networks, according to an embodiment. The system 1100 may include an edge device 1105 (e.g., a smartphone, internet of things (IoT) device, a computing device, a smart watch, an automotive device, etc.), a current base station 1110 (e.g., an endpoint (EP) to which the edge device 1105 is currently connected, etc.), speculative base stations 1165 (e.g., an EP to which the edge device 1105 may move to in the future, etc.), and a central office communications processing stack (CO) 1170.

An endpoint as used herein may refer to a service providing device (e.g., such as the current based station 1110, etc.) that is responsible for final delivery of data to the edge device 1105. In an example, an endpoint may be a node of the edge network that may provide data to another node in which case the other node is considered to be the edge device 1110. These endpoint-edge device relationships may occur at various levels throughout the edge network and between local devices in the edge network and a cloud providing services to the nodes, etc.

The central office communications processing stack 1170 is extended so that it supports proactive endpoint communications (in place of current reactive methods). The CO 1170/consumer premises equipment (CPE) based service determines the likelihood of a device changing to another EP (e.g., one of the speculative base stations 1165) during the course of a sequence of request/response/upload/download operations. The determination enables the service to dynamically route the communication to one of the speculative base stations 1165 either in addition to (or instead of) the current base station 1110 with which the interaction is in progress. To do this, two new base station capabilities and five new central office/CPE capabilities are added.

The base stations (e.g., the current base station 1105, the speculative base stations 1165, etc.) or a fog cloudlet may expose a new interface to devices. This interface allows the edge device 1105 to specify hints. The hints 1160 help it derive or know explicitly how the edge device 1105 moves across various EPs in a territorial span. The trajectory hints 1160 may be provided with each request or sent as separate updates (e.g., with no request attached). The hints 1160 include (but are not limited to): lists of previous locations (e.g., as a list of GPS coordinates, etc.) and time elapsed between each of the locations (from which time to reach projected new locations may be extrapolated); and a list of expected upcoming locations and expected time between each of those upcoming locations. Accordingly, the current base station 1110 may receive past/future trajectory and time vectors and propagate them to the CO 1170 (and inclusively, customer premises equipment) based services.

The packet processing logic of the base stations is extended to include packet handling schemes including, but not limited to: when a packet arrives from the CO 1170 for the edge device 1105 with UUID, the extended packet processing logic may drop the packet if the UUID is no longer connected to the current base station 1110 and it was connected N units of time before (N is configurable); when a speculative packet arrives from the CO 1170 for the edge device 1105 with UUID the logic may retain the packet in a buffer for M units of time (M is configurable). The logic will forward such a packet to the edge device 1105 when the device connects or may drop it after M units of time (meaning that it was a bad speculative forward).

The CO 1170/CPE is extended to expose to an evolved packet core (EPC) a new interface which the EPC may use to register models for training prediction (e.g., as bit-streams). The bit-streams present two interfaces: NewDeviceUUIDUpdate(previousLocations[ ], times[ ]) to receive information for use in training a model for predicting the cases when speculative responses should be issued and for selecting the entities to whom they should be directed; and GetCurrentModel( ) to obtain a current prediction model in the form of bit-stream. This model is then registered in a register 1135 for use by the acceleration elements in the CO 1170 or CPE so that it may perform the predictions for issuing speculative responses (e.g., indicating the new potential locations, times, etc.).

The CO 1170 is extended to furnish edge interfaces 1120 for use by base stations which, a base station transports the various hints 1160 from the edge device 1105 while including the UUID of the edge device 1105.

The CO 1170 includes an accelerated training model 1140 which is used to run the registered model and feed it information from a device location tracker 1155 that identifies various movements of the edge device 1105.

The CO 1170 includes an accelerated prediction model 1130 that is the trained model used by the EPC to determine (e.g., predict) when packets are to be sent back to the UUID based on a current timestamp and when the request was sent. The accelerated prediction model 1130 is updated periodically by the accelerated training model 1140. In an example, given a history of previous destinations and sources for the edge device 1105, there is a probability that the current movement will terminate with a previous destination. This insight may be used to accelerate the prediction over models that don't include movement history.

The CO 1170 includes a replication engine 1125 which is responsible for generating the speculative forwards and for sending them. The speculative forwards are sent to the target base station EP (e.g., one of the speculative base stations 1165) where the edge device 1105 may be connected now or in the near future. In an example, there may be a prioritized list of possible speculative forwarding locations from which the speculative base stations 1165 may be selected, a policy (e.g., identified in a service level agreement (SLA)) may determine a depth of the list (e.g., how many speculative base stations 1165 should be returned, etc.). For example, a low-cost SLA may speculatively forward to a single target destination while a high-cost SLA might forward to the top five or ten destinations.

In an example, base stations and other service providing entities may move from one location to another and may become unavailable. The movement and availability characteristics of the base stations may be tracked and that information may be used in determining the speculative base stations 1165 that may be forwarding locations for the edge device 1105. The systems and techniques discussed herein provide the ability to make contingency plans by preparing multiple speculative base stations 165 as forwarding locations for the edge device 1105. If the edge device, 1105 does not appear I the vicinity of a speculative base station at an expected time or is determined to have connected to another one of the speculative base stations 1165, the forwarding information may be discarded. Thus, the systems and techniques discussed herein maintain continuity of data flow to the edge device 1105 whether the edge device 1105 moves as predicted or does not move.

The edge device 1105 sends a request to the current base station 1110 to which the edge device 1105 is currently connected. In an example, the request may be for data from a service provider 1115. The request includes traditional payload and optionally historical location and future location hints 1160. The current base station 1110 forwards the request to the CO 1170 including the hint information. The CO 1170 provides the hint information representing new location and time 1150 data, if any, to the accelerated training model 1140. The request is sent to the corresponding service (e.g., local in the CO 1170, in the cloud, etc.). For example, a request may be received from the edge device for a service of the service provider 1115 via the current base station 1110 by the edge interfaces 1120. In an example, the current base station 1110 may be a base station that facilitates communication between the edge device 1105 and the CO 1170 or a customer premise equipment device.

Once the response from the service provider 1115 comes, the accelerated prediction model 1130 logic uses the current time and the time when the request was sent to the service provider 1115 to infer the relative location and motion characteristics for the UUID. The relative location and motion characteristics for the UUID allow the replication engine 1125 to determine the speculative base stations 1165 to which the edge device 1105 may be connected by the time that the response packet reaches the border of the network (e.g., one of the speculative base stations 1165). In an example, a time value may be calculated by the accelerated prediction model 1130 using a timestamp of the request. In an example, the time value may be calculated by finding a difference between the timestamp and a current time.

In an example, motion characteristics may be determined for the edge device 1105 by the accelerated prediction model 1130 using the time value. In an example, location data may be received from the edge device 1105. The location data (from the device location tracker 1155) may be evaluated to determine historical movements for the edge device and the historical movements may be used in determining the motion characteristics of the edge device 1105. In another example, a set of historical location data (e.g., hints 1160) retrieved using the UUID may be evaluated to calculate movement data for the edge device 1105 and the movement data may be used in determining the motion characteristics of the edge device 1105. In yet another example, the motion characteristics may be determined in part using historical locations and corresponding times collected for the edge device 1105.

The CO 1170 will send the response payload to the current base station 1110 through which the request was received and to one or more of the speculative base stations 1165 that the edge device 1105 is predicted (e.g., projected) to reach soon. In an example, only the speculative base stations 1165 that have a probability higher than a threshold probability may be selected by the accelerated prediction model 1130. In another example, a probability threshold may be determined so that if the likelihood of the edge device 1105 remaining within the coverage of the current base station 1110 falls below the threshold, then the current base station 1110 may not receive the response. The thresholds may be configurable to adjust the probability levels for transmitting the response to the current base station 1110 and the speculative base stations 1165.

In an example, a response to the request may be transmitted by the replication engine 1125 to a second endpoint of the speculative base stations 1165 based on the motion characteristics. In an example, a movement prediction model may be trained using edge device 1105 tracking data. The movement characteristics of the edge device 1105 may be evaluated using the prediction model. The second endpoint may be determined based on a probability that the edge device 1105 will be in the vicinity (e.g., within communication range, etc.) of the second endpoint output (e.g., data to be transmitted to the edge device 1105, etc.) as a result of the evaluation. In an example, the second endpoint may be selected based on the probability being outside a threshold probability. In another example, the movement characteristics of the edge device may be evaluated using the prediction model to determine a second probability that the edge device will be in the vicinity of the first endpoint. The response may be transmitted to the first endpoint and the second endpoint based on the second probability being above a first endpoint probability threshold.

The quality of service (QoS) management engine 1145 may ensure that service levels are maintained as the edge device 1105 moves. In an example, the QoS management engine 1145 may work in conjunction with the replication engine 1125 to select speculative base stations 1165 based on QoS metrics for the requested service. In an example, quality of service metrics may be identified for the service and the second endpoint may be selected in part based on the quality of service metrics.

The validator 1175 may validate the identity and authenticity of the edge device 1105. The edge device 1105 may also validate the base stations and other edge infrastructure to determine whether the communication partners are trustworthy. Therefore, mutual attestation may be employed so that the parties to a transaction may ensure mutual trust. The validator 1175 includes logic that validates that the edge device 1105 that is sending the data is authentic and that the current base station 1110 and speculative base stations 1165 are authentic. For example, a signature of the edge device 1105 and the current base station 1110 may be validated against a centralized database, etc. Edge networks may benefit from decentralized approaches (e.g., W3C Decentralized ID (DID)) DID allows for greater flexibility (e.g., for example more flexibility than public key infrastructure (PKI)) for describing 'web-of-trust' relationships. A DID credential allows credential verifiers to be named as service providers that a relying party may use when facing decisions about whether or not a device is allowed to forward content. Verifiers are the relying parties (e.g., base stations) and DIDs point to credential verification services. For example, the credential verification services may operate in the central Core but do not have to be centralized in terms of trust/identity authority. One of the DID verifier services may specialize in attestation rather than authentication or authorization. This is a natural extension of DID.

The prediction verification engine 1180 may learn quality metrics for predictions to determine how good or bad predictions are for various devices or device types. This may help to identify over time that some predictions are not valid for certain types of devices and may be used to indicate that the current prediction model for this type of device is no longer valid. In response, the accelerated training model 1140 may be updated and the accelerated prediction model 1130 may be retrained. This may allow for training of predictive models and models trained from observed data. The prediction verification engine 1180 may track incorrect predictions, send the incorrect predictions to the cloud, and the accelerated prediction model 1130 may be retrained and the retrained model may be registered. In an example, one or multiple models (e.g., global and by device type, etc.) that may be used to evaluate the motion characteristics of the edge device 1105.

The prediction verification engine 1180 may learn how well a prediction fit a particular device or device type using a variety of machine learning techniques. For example, neural networks including long short-term memory transformers may be used to learn the efficacy of a prediction in its application to a particular device or device type or based on a device parameter to determine if a model should be retrained.

In an example, the models may be trained based on flexibility of the forwarding parameters (e.g., how much data, how far ahead in terms of time, geo-location, codecs, etc.) rather than the type of device (e.g., vehicles such as a truck, car, drone, skateboard, etc.). This may allow the models to be more transportable across device types. The device types may differ in terms of how fast they can move (e.g., a car may move at sixty miles per hour, a skateboard may move at nine mile per hour). Thus, the average or optimal maximum speed may be a parameter that is common to all mobile devices.

In an example, it may be identified that the first endpoint and the second endpoint are in different security domains. Security credentials may be computed for the edge device 1105 for a security domain of the second endpoint and the security credentials may be transmitted to a data forwarding service of the first endpoint. In an example, the security credential may be a key. In another example, it may be identified that the first endpoint and the second endpoint are in a common security domain and security credentials for the edge device 1105 may be transmitted to the second endpoint.

Figure 12:
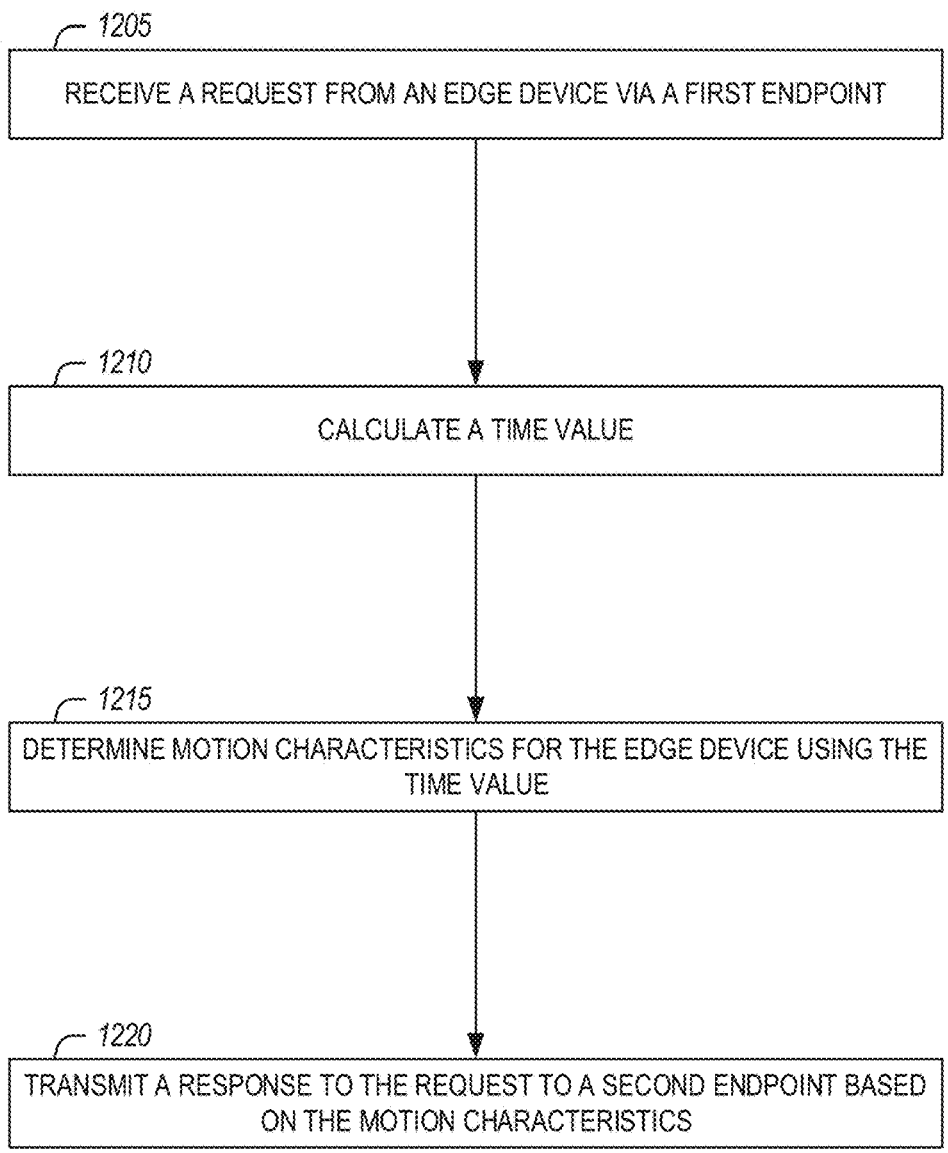
FIG. 12 illustrates an example of a method for intelligent data forwarding in edge networks, according to an embodiment.

FIG. 12 illustrates an example of a method 1200 for intelligent data forwarding in edge networks, according to an embodiment. The method 1200 may provide features as described in FIGS. 10 and 11.

At operation 1205, a request may be received from an edge device for a service via a first endpoint (e.g., by the edge interfaces 1120 as described in FIG. 11, etc.). In an example, the first endpoint may be a base station that facilitates communication between the edge device and a customer premise equipment device.

In an example, the request may contain an attestation token that specifies a risk level. A policy containing an acceptable risk threshold may be checked. If the risk level is below the threshold, an error may be returned.

In an example, the attestation token may be obtained a priori using an attestation service that the edge device previously registered with (e.g., every morning the edge device may renew a daily token with the attestation service, etc.). When the requestor makes the request, an updated daily token may first be obtained from an attestation token provider service.

At operation 1210, a time value may be calculated using a timestamp of the request (e.g., by the accelerated prediction model 1130 as described in FIG. 11, etc.). In an example, the time value may be calculated by finding a difference between the timestamp and a current time.

At operation 1215, motion characteristics may be determined for the edge device using the time value (e.g., by the accelerated prediction model 1130 as described in FIG. 11, etc.). In an example, location data may be received from the edge device. The location data may be evaluated to determine historical movements for the edge device and the historical movements may be used in determining the motion characteristics of the edge device. In another example, a set of historical location data retrieved using the UUID may be evaluated to calculate movement data for the edge device and the movement data may be used in determining the motion characteristics of the edge device. In yet another example, the motion characteristics may be determined in part using historical locations and corresponding times collected for the edge device. The historical locations may include location specific conditions regarding navigability of the location or hazard.

At operation 1220, a response may be transmitted response to the request to a second endpoint based on the motion characteristics. In an example, a movement prediction model may be trained using edge device tracking data. The movement characteristics of the edge device may be evaluated using the prediction model. The second endpoint may be determined based on a probability that the edge device will be in the vicinity of the second endpoint output as a result of the evaluation. In an example, the second endpoint may be selected based on the probability being outside a threshold probability. In another example, quality of service metrics may be identified for the service and the second endpoint may be selected in part based on the quality of service metrics.

In an example, the movement characteristics of the edge device may be evaluated using the prediction model to determine a second probability that the edge device will be in the vicinity of the first endpoint. The response may be transmitted to the first endpoint and the second endpoint based on the second probability being above a first endpoint probability threshold.

In an example, it may be identified that the first endpoint and the second endpoint are in different security domains. Security credentials may be computed for the edge device for a security domain of the second endpoint and the security credentials may be transmitted to a data forwarding service of the first endpoint. In an example, the security credential may be a key. In another example, it may be identified that the first endpoint and the second endpoint are in a common security domain and security credentials for the edge device may be transmitted to the second endpoint. In an example, the security context may include an attestation token context. Because the endpoints are in different security domains, the data forwarding service may also function as a security domain gateway where the security credentials authorized in a first domain are re-issued in the context of the second domain. Re-issuance may involve a security provider re-authenticating, re-assessing, and re-provisioning the mobile endpoint with credentials/tokens reflecting the authority and authorization of the second domain.

Note: In the context of a decentralized DID credential type, the credential may list the domain discovery service that present a directly of domain security service providers used to re-issue credentials for the second domain.

ADDITIONAL NOTES & EXAMPLES

Example 1 is a system for intelligent data forwarding in edge networks comprising: at least one processor; and memory including instructions that, when executed by the at least one processor, cause the at least one processor to perform operations to: receive a request from an edge device for a service via a first endpoint; calculate a time value using a timestamp of the request; predict, using a trained movement prediction model, motion characteristics for the edge device using the time value, the trained movement prediction model based on historical location and time data for the edge device; and transmit a response to the request to a second endpoint based on the motion characteristics.

In Example 2, the subject matter of Example 1 wherein the first endpoint is a base station that facilitates communication between the edge device and a customer premise device.

In Example 3, the subject matter of Examples 1-2 wherein the time value is calculated by finding a difference between the timestamp and a current time.

In Example 4, the subject matter of Examples 1-3 wherein the request includes a universally unique identifier (UUID) and the memory further comprising instructions that cause the at least one processor to perform operations to: evaluate a set of historical location data retrieved using the UUID to calculate movement data for the edge device, wherein the movement data is further used in determining the motion characteristics of the edge device.

In Example 5, the subject matter of Examples 1-4 includes, the memory further comprising instructions that cause the at least one processor to perform operations to: train a movement prediction model using edge device tracking data, wherein the movement prediction model produces a probability that the edge device will move into a vicinity of the second endpoint; and determine the second endpoint based on the probability.

In Example 6, the subject matter of Example 5 wherein the second endpoint is selected based on the probability being outside a threshold probability.

In Example 7, the subject matter of Examples 5-6 includes, the memory further comprising instructions that cause the at least one processor to perform operations to: evaluate the movement characteristics of the edge device using the prediction model to determine a second probability that the edge device will be in the vicinity of the first endpoint; and transmit the response to the first endpoint and the second endpoint based on the second probability being above a first endpoint probability threshold.

In Example 8, the subject matter of Examples 1-7 wherein the motion characteristics are determined in part using historical locations and corresponding times collected for the edge device.

In Example 9, the subject matter of Examples 1-8 includes, the memory further comprising instructions that cause the at least one processor to perform operations to: identify that the first endpoint and the second endpoint are in different security domains; compute security credentials for the edge device for a security domain of the second endpoint; and transmit the security credentials to a data forwarding service of the first endpoint.

In Example 10, the subject matter of Example 9 wherein the security credential is a key.

In Example 11, the subject matter of Examples 1-10 includes, the memory further comprising instructions that cause the at least one processor to perform operations to: identify that the first endpoint and the second endpoint are in a common security domain; and transmit security credentials for the edge device to the second endpoint.

In Example 12, the subject matter of Examples 1-11 includes, the memory further comprising instructions that cause the at least one processor to perform operations to: identify quality of service metrics for the service, wherein the second endpoint is selected in part based on the quality of service metrics.

In Example 13, the subject matter of Examples 1-12 includes, the memory further comprising instructions that cause the at least one processor to perform operations to: execute the request and the response in a trusted execution environment of the edge device; and prevent other edge devices and edge infrastructure owners from reading or modifying data of the request and data of the response.

In Example 14, the subject matter of Examples 1-13 includes, the memory further comprising instructions that cause the at least one processor to perform operations to: determine that the edge device did not move into a vicinity of the second endpoint; generate a failure model based in part on the determination; and retrain a movement prediction model using the failure model.

In Example 15, the subject matter of Examples 1-14 includes, the memory further comprising instructions that cause the at least one processor to perform operations to: receive attestation data included in the request; process the attestation data to obtain an edge device attestation result; process second endpoint attestation data to obtain a second endpoint attestation result: transmit the edge device attestation result to the second endpoint; and transmit the second endpoint attestation result to the edge device.

Example 16 is at least one machine-readable medium including instructions for intelligent data forwarding in edge networks that, when executed by at least one processor, cause the at least one processor to perform operations to: receive a request from an edge device for a service via a first endpoint; calculate a time value using a timestamp of the request; predict, using a trained movement prediction model, motion characteristics for the edge device using the time value, the trained movement prediction model based on historical location and time data for the edge device; and transmit a response to the request to a second endpoint based on the motion characteristics.

In Example 17, the subject matter of Example 16 wherein the first endpoint is a base station that facilitates communication between the edge device and a customer premise device.

In Example 18, the subject matter of Examples 16-17 wherein the time value is calculated by finding a difference between the timestamp and a current time.

In Example 19, the subject matter of Examples 16-18 wherein the request includes a universally unique identifier (UUID) and further comprising instructions that cause the at least one processor to perform operations to: evaluate a set of historical location data retrieved using the UUID to calculate movement data for the edge device, wherein the movement data is further used in determining the motion characteristics of the edge device.

In Example 20, the subject matter of Examples 16-19 includes, instructions that cause the at least one processor to perform operations to: train a movement prediction model using edge device tracking data, wherein the movement prediction model produces a probability that the edge device will move into a vicinity of the second endpoint; and determine the second endpoint based on the probability.

In Example 21, the subject matter of Example 20 wherein the second endpoint is selected based on the probability being outside a threshold probability.

In Example 22, the subject matter of Examples 20-21 includes, instructions that cause the at least one processor to perform operations to: evaluate the movement characteristics of the edge device using the prediction model to determine a second probability that the edge device will be in the vicinity of the first endpoint; and transmit the response to the first endpoint and the second endpoint based on the second probability being above a first endpoint probability threshold.

In Example 23, the subject matter of Examples 16-22 wherein the motion characteristics are determined in part using historical locations and corresponding times collected for the edge device.

In Example 24, the subject matter of Examples 16-23 includes, instructions that cause the at least one processor to perform operations to: identify that the first endpoint and the second endpoint are in different security domains; compute security credentials for the edge device for a security domain of the second endpoint; and transmit the security credentials to a data forwarding service of the first endpoint.

In Example 25, the subject matter of Example 24 wherein the security credential is a key.

In Example 26, the subject matter of Examples 16-25 includes, instructions that cause the at least one processor to perform operations to: identify that the first endpoint and the second endpoint are in a common security domain; and transmit security credentials for the edge device to the second endpoint.

In Example 27, the subject matter of Examples 16-26 includes, instructions that cause the at least one processor to perform operations to: identify quality of service metrics for the service, wherein the second endpoint is selected in part based on the quality of service metrics.

In Example 28, the subject matter of Examples 16-27 includes, instructions that cause the at least one processor to perform operations to: execute the request and the response in a trusted execution environment of the edge device; and prevent other edge devices and edge infrastructure owners from reading or modifying data of the request and data of the response.

In Example 29, the subject matter of Examples 16-28 includes, instructions that cause the at least one processor to perform operations to: determine that the edge device did not move into a vicinity of the second endpoint; generate a failure model based in part on the determination; and retrain a movement prediction model using the failure model.

In Example 30, the subject matter of Examples 16-29 includes, instructions that cause the at least one processor to perform operations to: receive attestation data included in the request; process the attestation data to obtain an edge device attestation result; process second endpoint attestation data to obtain a second endpoint attestation result; transmit the edge device attestation result to the second endpoint; and transmit the second endpoint attestation result to the edge device.

Example 31 is a method for intelligent data forwarding in edge networks comprising: receiving a request from an edge device for a service via a first endpoint; calculating a time value using a timestamp of the request; predicting, using a trained movement prediction model, motion characteristics for the edge device using the time value, the trained movement prediction model based on historical location and time data for the edge device; and transmitting a response to the request to a second endpoint based on the motion characteristics.

In Example 32, the subject matter of Example 31 wherein the first endpoint is a base station that facilitates communication between the edge device and a customer premise device.

In Example 33, the subject matter of Examples 31-32 wherein the time value is calculated by finding a difference between the timestamp and a current time.

In Example 34, the subject matter of Examples 31-33 wherein the request includes a universally unique identifier (UUID) and further comprising: evaluating a set of historical location data retrieved using the UUID to calculate movement data for the edge device, wherein the movement data is further used in determining the motion characteristics of the edge device.

In Example 35, the subject matter of Examples 31-34 includes, training a movement prediction model using edge device tracking data, wherein the movement prediction model produces a probability that the edge device will move into a vicinity of the second endpoint; and determining the second endpoint based on the probability.

In Example 36, the subject matter of Example 35 wherein the second endpoint is selected based on the probability being outside a threshold probability.

In Example 37, the subject matter of Examples 35-36 includes, evaluating the movement characteristics of the edge device using the prediction model to determine a second probability that the edge device will be in the vicinity of the first endpoint; and transmitting the response to the first endpoint and the second endpoint based on the second probability being above a first endpoint probability threshold.

In Example 38, the subject matter of Examples 31-37 wherein the motion characteristics are determined in part using historical locations and corresponding times collected for the edge device.

In Example 39, the subject matter of Examples 31-38 includes, identifying that the first endpoint and the second endpoint are in different security domains; computing security credentials for the edge device for a security domain of the second endpoint; and transmitting the security credentials to a data forwarding service of the first endpoint.

In Example 40, the subject matter of Example 39 wherein the security credential is a key.

In Example 41, the subject matter of Examples 31-40 includes, identifying that the first endpoint and the second endpoint are in a common security domain; and transmitting security credentials for the edge device to the second endpoint.

In Example 42, the subject matter of Examples 31-41 includes, identifying quality of service metrics for the service, wherein the second endpoint is selected in part based on the quality of service metrics.

In Example 43, the subject matter of Examples 31-42 includes, executing the request and the response in a trusted execution environment of the edge device; and preventing other edge devices and edge infrastructure owners from reading or modifying data of the request and data of the response.

In Example 44, the subject matter of Examples 31-43 includes, determining that the edge device did not move into a vicinity of the second endpoint; generating a failure model based in part on the determination; and retraining a movement prediction model using the failure model.

In Example 45, the subject matter of Examples 31-44 includes, receiving attestation data included in the request; processing the attestation data to obtain an edge device attestation result; processing second endpoint attestation data to obtain a second endpoint attestation result; transmitting the edge device attestation result to the second endpoint; and transmitting the second endpoint attestation result to the edge device.

Example 46 is at least one machine-readable medium including instructions that, when executed by a machine, cause the machine to perform any method of Examples 31-45.

Example 47 is a system comprising means to perform any method of Examples 31-45.

Example 48 is a system for intelligent data forwarding in edge networks comprising: means for receiving a request from an edge device for a service via a first endpoint; means for calculating a time value using a timestamp of the request; means for predicting, using a trained movement prediction model, motion characteristics for the edge device using the time value, the trained movement prediction model based on historical location and time data for the edge device; and means for transmitting a response to the request to a second endpoint based on the motion characteristics.

In Example 49, the subject matter of Example 48 wherein the first endpoint is a base station that facilitates communication between the edge device and a customer premise device.

In Example 50, the subject matter of Examples 48-49 wherein the means for calculating the time value include means for calculating a difference between the timestamp and a current time.

In Example 51, the subject matter of Examples 48-50 wherein the request includes a universally unique identifier (UUID) and further comprising: means for evaluating a set of historical location data retrieved using the UUID to calculate movement data for the edge device, wherein the movement data is further used in determining the motion characteristics of the edge device.

In Example 52, the subject matter of Examples 48-51 includes, means for training a movement prediction model using edge device tracking data, wherein the movement prediction model produces a probability that the edge device will move into a vicinity of the second endpoint; and means for determining the second endpoint based on the probability.

In Example 53, the subject matter of Example 52 wherein the second endpoint is selected based on the probability being outside a threshold probability.

In Example 54, the subject matter of Examples 52-53 includes, means for evaluating the movement characteristics of the edge device using the prediction model to determine a second probability that the edge device will be in the vicinity of the first endpoint; and means for transmitting the response to the first endpoint and the second endpoint based on the second probability being above a first endpoint probability threshold.

In Example 55, the subject matter of Examples 48-54 wherein the motion characteristics are determined in part using historical locations and corresponding times collected for the edge device.

In Example 56, the subject matter of Examples 48-55 includes, means for identifying that the first endpoint and the second endpoint are in different security domains; means for computing security credentials for the edge device for a security domain of the second endpoint; and means for transmitting the security credentials to a data forwarding service of the first endpoint.

In Example 57, the subject matter of Example 56 wherein the security credential is a key.

In Example 58, the subject matter of Examples 48-57 includes, means for identifying that the first endpoint and the second endpoint are in a common security domain; and means for transmitting security credentials for the edge device to the second endpoint.

In Example 59, the subject matter of Examples 48-58 includes, means for identifying quality of service metrics for the service, wherein the second endpoint is selected in part based on the quality of service metrics.

In Example 60, the subject matter of Examples 48-59 includes, means for executing the request and the response in a trusted execution environment of the edge device; and means for preventing other edge devices and edge infrastructure owners from reading or modifying data of the request and data of the response.

In Example 61, the subject matter of Examples 48-60 includes, means for determining that the edge device did not move into a vicinity of the second endpoint; means for generating a failure model based in part on the determination; and means for retraining a movement prediction model using the failure model.

In Example 62, the subject matter of Examples 48-61 includes, means for receiving attestation data included in the request; means for processing the attestation data to obtain an edge device attestation result; means for processing second endpoint attestation data to obtain a second endpoint attestation result; means for transmitting the edge device attestation result to the second endpoint; and means for transmitting the second endpoint attestation result to the edge device.

Example 63 is at least one machine-readable medium including instructions that, when executed by processing circuitry, cause the processing circuitry to perform operations to implement of any of Examples 1-62.

Example 64 is an apparatus comprising means to implement of any of Examples 1-62.

Example 65 is a system to implement of any of Examples 1-62.

Example 66 is a method to implement of any of Examples 1-62.

Example 67 is an apparatus of an edge computing system comprising: one or more processors and one or more computer-readable media comprising instructions that, when executed by the one or more processors, cause the one or more processors to perform any of the methods of Examples 1-62.

Example 68 is one or more computer-readable storage media comprising instructions to cause an electronic device of an edge computing system, upon execution of the instructions by one or more processors of the electronic device, to perform any of the intelligent data forwarding in edge networks methods of Examples 1-62.

Example 69 is a computer program used in an edge computing system, the computer program comprising instructions, wherein execution of the program by a processing element in the edge computing system is to cause the processing element to perform any of the intelligent data forwarding in edge networks methods of Examples 1-62.

Example 70 is an edge computing appliance device operating as a self-contained processing system, comprising a housing, case or shell, network communication circuitry, storage memory circuitry, and processor circuitry, adapted to perform any of the intelligent data forwarding in edge networks methods of Examples 1-62.

Example 71 is an apparatus of an edge computing system comprising means to perform any of the intelligent data forwarding in edge networks methods of Examples 1-62.

Example 72 is an apparatus of an edge computing system comprising logic, modules, or circuitry to perform any of the intelligent data forwarding in edge networks methods of Examples 1-62.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for intelligent data forwarding in edge networks comprising:
at least one processor; and
memory including instructions that, when executed by the at least one processor, cause the at least one processor to perform operations to:
receive a request from an edge user device for a service via a first endpoint;
calculate a time value using a timestamp of the request;
train a movement prediction model using edge user device tracking data, wherein the trained movement prediction model produces a first probability that the edge user device is in a vicinity of the first endpoint and a second probability that the edge user device will move into a vicinity of a second endpoint, the trained movement prediction model based on historical location and time data for the edge user device;
predict, using the trained movement prediction model, motion characteristics for the edge user device using the time value;
evaluate the motion characteristics for the edge user device using the trained movement prediction model to determine the first probability that the edge user device will be in a vicinity of the first endpoint and the second probability that the edge user device will move into a vicinity of the second endpoint;
transmit a response to the request to the first endpoint and to the second endpoint based on the second probability being above a first endpoint probability threshold, the second endpoint determined based on the second probability.

2. The system of claim 1, wherein the request includes a universally unique identifier (UUID) and the memory further comprising instructions that cause the at least one processor to perform operations to:
evaluate a set of historical location data retrieved using the UUID to calculate movement data for the edge user device, wherein the movement data is further used in determining the motion characteristics of the edge user device.

3. The system of claim 1, the memory further comprising instructions that cause the at least one processor to perform operations to:
identify that the first endpoint and the second endpoint are in different security domains;
compute security credentials for the edge user device for a security domain of the second endpoint; and
transmit the security credentials to a data forwarding service of the first endpoint.

4. The system of claim 1, the memory further comprising instructions that cause the at least one processor to perform operations to:
identify that the first endpoint and the second endpoint are in a common security domain; and
transmit security credentials for the edge user device to the second endpoint.

5. The system of claim 1, the memory further comprising instructions that cause the at least one processor to perform operations to:
determine that the edge user device did not move into a vicinity of the second endpoint;
generate a failure model based in part on the determination; and
retrain a movement prediction model using the failure model.

6. The system of claim 1, the memory further comprising instructions that cause the at least one processor to perform operations to:
receive attestation data included in the request;
process the attestation data to obtain an edge user device attestation result;
process second endpoint attestation data to obtain a second endpoint attestation result;
transmit the edge user device attestation result to the second endpoint; and
transmit the second endpoint attestation result to the edge user device.

7. At least one non-transitory machine-readable medium including instructions for intelligent data forwarding in edge networks that, when executed by at least one processor, cause the at least one processor to perform operations to:
receive a request from an edge user device for a service via a first endpoint;
calculate a time value using a timestamp of the request;
train a movement prediction model using edge user device tracking data, wherein the trained movement prediction model produces a first probability that the edge user device is in a vicinity of the first endpoint and a second probability that the edge user device will move into a vicinity of a second endpoint, the trained movement prediction model based on historical location and time data for the edge user device;
predict, using the trained movement prediction model, motion characteristics for the edge user device using the time value;
evaluate the motion characteristics for the edge user device using the trained movement prediction model to determine the first probability that the edge user device will be in a vicinity of the first endpoint and the second probability that the edge user device will move into a vicinity of the second endpoint;
transmit a response to the request to the first endpoint and to the second endpoint based on the second probability being above a first endpoint probability threshold, the second endpoint determined based on the second probability.

8. The at least one non-transitory machine-readable medium of claim 7, wherein the request includes a universally unique identifier (UUID) and further comprising instructions that cause the at least one processor to perform operations to:
evaluate a set of historical location data retrieved using the UUID to calculate movement data for the edge user device, wherein the movement data is further used in determining the motion characteristics of the edge user device.

9. The at least one non-transitory machine-readable medium of claim 7, further comprising instructions that cause the at least one processor to perform operations to:
identify that the first endpoint and the second endpoint are in different security domains;
compute security credentials for the edge user device for a security domain of the second endpoint; and
transmit the security credentials to a data forwarding service of the first endpoint.

10. The at least one non-transitory machine-readable medium of claim 7, further comprising instructions that cause the at least one processor to perform operations to:
identify that the first endpoint and the second endpoint are in a common security domain; and transmit security credentials for the edge user device to the second endpoint.

11. The at least one non-transitory machine-readable medium of claim 7, further comprising instructions that cause the at least one processor to perform operations to:
determine that the edge user device did not move into a vicinity of the second endpoint;
generate a failure model based in part on the determination; and
retrain a movement prediction model using the failure model.

12. The at least one non-transitory machine-readable medium of claim 7, further comprising instructions that cause the at least one processor to perform operations to:
receive attestation data included in the request;
process the attestation data to obtain an edge user device attestation result;
process second endpoint attestation data to obtain a second endpoint attestation result;
transmit the edge user device attestation result to the second endpoint; and
transmit the second endpoint attestation result to the edge user device.

13. A method for intelligent data forwarding in edge networks comprising:
receiving a request from an edge user device for a service via a first endpoint;
calculating a time value using a timestamp of the request;
training a movement prediction model using edge user device tracking data,
wherein the trained movement prediction model produces a first probability that the edge user device is in a vicinity of the first endpoint and a second probability that the edge user device will move into a vicinity of a second endpoint, the trained movement prediction model based on historical location and time data for the edge user device;
predicting, using the trained movement prediction model, motion characteristics for the edge user device using the time value;
evaluating the motion characteristics for the edge user device using the trained movement prediction model to determine the first probability that the edge user device will be in a vicinity of the first endpoint and the second probability that the edge user device will move into a vicinity of the second endpoint;
transmitting a response to the request to the first endpoint and to the second endpoint based on the second probability being above a first endpoint probability threshold, the second endpoint determined based on the second probability.

14. The method of claim 13, wherein the request includes a universally unique identifier (UUID) and further comprising:
evaluating a set of historical location data retrieved using the UUID to calculate movement data for the edge user device, wherein the movement data is further used in determining the motion characteristics of the edge user device.

15. The method of claim 13, further comprising:
identifying that the first endpoint and the second endpoint are in different security domains;
computing security credentials for the edge user device for a security domain of the second endpoint; and
transmitting the security credentials to a data forwarding service of the first endpoint.

16. The method of claim 13, further comprising:
identifying that the first endpoint and the second endpoint are in a common security domain; and
transmitting security credentials for the edge user device to the second endpoint.

17. The method of claim 13, further comprising:
determining that the edge user device did not move into a vicinity of the second endpoint;
generating a failure model based in part on the determination; and
retraining a movement prediction model using the failure model.

18. The method of claim 13, further comprising:
receiving attestation data included in the request;
processing the attestation data to obtain an edge user device attestation result;
processing second endpoint attestation data to obtain a second endpoint attestation result;
transmitting the edge user device attestation result to the second endpoint; and
transmitting the second endpoint attestation result to the edge user device.

* * * * *